United States Patent
Krakowski et al.

(10) Patent No.: US 9,321,535 B2
(45) Date of Patent: Apr. 26, 2016

(54) SYSTEM AND PROCESS FOR COOLING AN AIRCRAFT ZONE USING AN AIRCRAFT-EXTERNAL AIR ASSEMBLY

(75) Inventors: Dariusz Krakowski, Buxtehude (DE); Stefan Gumm, Hamburg (DE); Juergen Kelnhofer, Jork (DE)

(73) Assignee: Airbus Operations GmbH, Hamburg (DE)

( * ) Notice: Subject to any disclaimer, the term of this patent is extended or adjusted under 35 U.S.C. 154(b) by 1130 days.

(21) Appl. No.: 13/203,386

(22) PCT Filed: Feb. 18, 2010

(86) PCT No.: PCT/EP2010/001033
§ 371 (c)(1),
(2), (4) Date: Nov. 7, 2011

(87) PCT Pub. No.: WO2010/097181
PCT Pub. Date: Sep. 2, 2010

(65) Prior Publication Data
US 2012/0064816 A1    Mar. 15, 2012

Related U.S. Application Data (60) Provisional application No. 61/208,578, filed on Feb. 25, 2009.

(30) Foreign Application Priority Data

Feb. 25, 2009   (DE) .......................... 10 2009 010 546

(51) Int. Cl.
B64D 13/06   (2006.01)
B64D 13/00   (2006.01)
B64F 1/36    (2006.01)

(52) U.S. Cl.
CPC ................ *B64D 13/00* (2013.01); *B64F 1/364* (2013.01); *Y02T 50/44* (2013.01); *Y02T 50/56* (2013.01)

(58) Field of Classification Search
None
See application file for complete search history.

(56) References Cited

U.S. PATENT DOCUMENTS

| | | | |
|---|---|---|---|
| 4,209,993 A * | 7/1980 | Rannenberg | B60H 1/32 62/239 |
| 4,517,813 A | 5/1985 | Eggebrecht et al. | |
| RE32,100 E * | 4/1986 | Rannenberg | B60H 1/32 62/239 |
| 4,835,977 A | 6/1989 | Haglund et al. | |
| 5,086,622 A * | 2/1992 | Warner | B64D 13/06 62/172 |

(Continued)

FOREIGN PATENT DOCUMENTS

| CN | 1681707 | 1/2008 |
|---|---|---|
| CN | 101146712 | 3/2008 |

(Continued)

*Primary Examiner* — Gregory Huson
*Assistant Examiner* — Martha Becton
(74) *Attorney, Agent, or Firm* — Taft Stettinius & Hollister LLP (57) ABSTRACT

A system for cooling an aircraft zone includes a mixing chamber which is connected to an air-conditioning assembly for making cool air available and/or to a recirculated-air conveying device for supplying recirculated air into the mixing chamber. The system further includes an aircraft-side air-distribution system which includes at least one line connecting the mixing chamber to the aircraft zone to be cooled and also at least one line that is connectable to an aircraft-external air-generating assembly in order to route air made available by the aircraft-external air-generating assembly into the aircraft-side air-distribution system.

15 Claims, 3 Drawing Sheets

(56) References Cited

U.S. PATENT DOCUMENTS

| | | | | |
|---|---|---|---|---|
| 5,516,330 | A * | 5/1996 | Dechow et al. | 454/74 |
| 6,306,032 | B1 * | 10/2001 | Scheffler et al. | 454/71 |
| 6,401,473 | B1 * | 6/2002 | Ng | B64D 13/06 454/71 |
| 6,655,168 | B2 * | 12/2003 | Mitani | B64D 13/06 62/402 |
| 7,121,100 | B2 * | 10/2006 | Atkey | B64D 13/06 62/172 |
| 7,322,203 | B2 | 1/2008 | Widegren | |
| 7,607,318 | B2 * | 10/2009 | Lui | B64D 13/06 244/118.5 |
| 7,828,244 | B2 | 11/2010 | Heinrich et al. | |
| 7,878,887 | B2 * | 2/2011 | Elmers | B64D 13/00 454/71 |
| 8,272,930 | B2 * | 9/2012 | Klimpel | B64D 13/02 454/71 |
| 8,336,821 | B2 * | 12/2012 | Shell | B64D 13/06 165/108 |
| 8,365,550 | B2 * | 2/2013 | Vogel | 62/401 |
| 8,752,772 | B2 * | 6/2014 | Schumacher | B64D 13/00 236/44 C |
| 2004/0231350 | A1 | 11/2004 | Kline et al. | |
| 2007/0084938 | A1 * | 4/2007 | Liu | 236/91 D |
| 2007/0235587 | A1 | 10/2007 | Delort | |
| 2009/0107160 | A1 * | 4/2009 | Montminy et al. | 62/239 |
| 2009/0107657 | A1 * | 4/2009 | Montminy et al. | 165/104.31 |
| 2010/0101251 | A1 * | 4/2010 | Kelnhofer | B64D 13/06 62/133 |
| 2011/0177771 | A1 | 7/2011 | Kelnhofer et al. | |
| 2011/0284201 | A1 * | 11/2011 | Soenmez et al. | 165/287 |

FOREIGN PATENT DOCUMENTS

| | | |
|---|---|---|
| WO | WO 2009/156140 A2 | 12/2009 |
| WO | WO 2010/003640 A2 | 1/2010 |

* cited by examiner

SYSTEM AND PROCESS FOR COOLING AN AIRCRAFT ZONE USING AN AIRCRAFT-EXTERNAL AIR ASSEMBLY

CROSS REFERENCE TO RELATED APPLICATIONS

The present application is a §371 national stage patent application of PCT/EP2010/001033, filed Feb. 18, 2010, which claims the benefit of U.S. Provisional Application No. 61/208,578, filed Feb. 25, 2009 and claims priority to German Patent Application No. 10 2009 010 546.8, filed Feb. 25, 2009, each of which is incorporated herein by reference.

The present invention relates to a system and to a process for cooling an aircraft zone, in which an aircraft-external air assembly comes into operation.

An aircraft-internal air-conditioning plant requires for orderly operation highly compressed process air which is made available to the air-conditioning plant by the engines or by the auxiliary power unit (APU) of the aircraft or, in ground operation of the aircraft, also by an aircraft-external high-pressure air-generating assembly. If none of these process-air supply systems is available, the air-conditioning plant of the aircraft cannot be operated. Furthermore, in ground operation of an aircraft—for example, during maintenance work persisting for a relatively long time—operation of the air-conditioning plant of the aircraft may not be desirable for reasons of cost or may not be possible for reasons of safety. It is therefore customary to supply aircraft in ground operation with pre-cooled air which is made available by an aircraft-external low-pressure air-generating assembly.

Low-pressure air-generating assemblies are available in differing designs and with differing cooling capacities. Most of the low-pressure air-generating assemblies currently employed make cooling air available with a temperature of about +5° C., the amount of cooling air generated and also the system pressure and hence the pressure of the cooling air each depending on the configuration of the low-pressure air-generating assemblies. However, low-pressure air-generating assemblies already exist that are capable of generating cooling air with a temperature of below 0° C. An aircraft-external low-pressure air-generating assembly is linked to standardised aircraft-side ports with the aid of connecting hoses, so that the cooling air generated by the low-pressure air-generating assembly can be conducted into the interior of the aircraft. Therein the cooling air is routed with the aid of aircraft-internal air-distribution systems into the aircraft zones to be cooled, such as, for example, the passenger compartment, the cockpit, the cargo compartments or various installation spaces of heat-generating, in particular electronic, components of the aircraft. Only before the start of the aircraft engines is the aircraft-internal low-pressure air-generating assembly separated from the aircraft and the cooling of the aircraft zones to be cooled taken over by the air-conditioning plant of the aircraft.

An aircraft air-conditioning plant that is employed at the present time includes a mixing chamber arranged in a pressurised zone of the aircraft, to which, in operation of the air-conditioning plant of the aircraft, very cold air with a temperature of down to about −25° C. and with a relatively high pressure and also warm recirculated air with a temperature of about +30° C. is supplied by the air-conditioning assemblies of the air-conditioning plant of the aircraft. The air that is mixed in the mixing chamber for the purpose of setting a desired temperature is subsequently routed into the aircraft zones to be cooled via diverse air-distribution lines. For the purpose of controlling the flow of air within the air-conditioning plant, in lines connecting the air-conditioning assemblies to the mixing chamber there are arranged in each instance corresponding check valves which prevent recirculated air which is provided to be supplied into the mixing chamber from escaping into the air-conditioning assemblies arranged outside the pressurised aircraft zone.

If in ground operation of the aircraft an aircraft-external low-pressure air-generating assembly takes over the cooling of the aircraft zones to be cooled, the air made available by the low-pressure air-generating assembly is routed directly into the mixing chamber of the air-conditioning plant of the aircraft via a corresponding aircraft-side low-pressure air-distribution system. The low-pressure air-distribution system includes an inlet line which extends through the unpressurised belly fairing into the pressurised zone of the aircraft in the direction of the mixing chamber. A check valve arranged in the inlet line in a transition zone between the pressurised and the unpressurised zones of the aircraft prevents a back flow of air out of the portion of the inlet line arranged in the pressurised zone of the aircraft into the inlet-line portion extending through the unpressurised aircraft zone. The check valve consequently prevents air from escaping out of the pressurised zone of the aircraft in the case of a leak in the part of the low-pressure air-distribution system arranged in the unpressurised aircraft zone.

In currently known aircraft cooling systems there is the problem that in the operation of a cooling system using an aircraft-external air assembly no exchange of information with regard to current operating parameters takes place between the aircraft-side components of the cooling system and the aircraft-external air assembly. This can result in critical operating states. In particular, in currently known aircraft cooling systems in the case where low-pressure air-generating assemblies are employed that are capable of generating cooling air with a very low temperature of below 0° C. there is a considerable risk of an icing of the aircraft-side air-distribution systems. In order to counteract damage caused by icing, components of the aircraft-side air-distribution systems that are at risk of icing—such as, for example, valves or flaps—have to be designed to be more stable, have to be heated, or have to be coupled with additional electronic systems registering a possible faulty operation. This results in additional costs as well as undesirable added weight. Furthermore, by reason of the absent exchange of information between the aircraft-side components of the cooling system and the aircraft-external air assembly an optimised control of the cooling capacity made available by the aircraft-external air assembly is not possible. In defined operating phases of the cooling system the aircraft-external air assembly consequently supplies a cooling capacity that under certain circumstances is too high. This has a negative influence on the energy consumption of the cooling system.

The present invention is directed towards the object of specifying a system and a process for cooling an aircraft zone, which, in the case where an aircraft-external air assembly is employed, enable in ground operation of the aircraft a safe and energy-efficient cooling of the aircraft zone to be cooled.

This object is achieved by a system for cooling an aircraft zone, with the features of claim 1, and also by a process for cooling an aircraft zone, with the features of claim 9.

A system according to the invention for cooling an aircraft zone includes a mixing chamber which is connected to an air-conditioning assembly for making cool air available and/or to a recirculated-air conveying device for supplying recirculated air into the mixing chamber. The aircraft zone to be cooled with the aid of the cooling system according to the invention may be a passenger compartment, a cockpit or a cargo compartment. Furthermore, with the aid of the cooling system according to the invention an installation space of a thermally loaded component on board the aircraft—such as, for example, an electronic system—can be cooled. The air-conditioning assembly is preferentially arranged in an unpressurised zone of the aircraft and has been set up to make air available with a temperature of about −25° C. The recirculated-air conveying device may, for example, be designed in the form of a blower and serves to conduct recirculation air from the aircraft zone to be cooled—for example, a passenger cabin—back into the mixing chamber of the cooling system. The recirculation air conveyed into the mixing chamber by the recirculated-air conveying device preferentially has a temperature of about +30° C.

In the mixing chamber a mixing occurs with the cool air made available by the air-conditioning assembly. If desired or required, the cooling system according to the invention may include merely one air-conditioning assembly and merely one recirculated-air conveying device. However, the system preferentially includes two or more air-conditioning assemblies and two or more recirculated-air conveying devices.

The recirculated-air conveying device and the mixing chamber of the cooling system according to the invention are preferentially provided to be arranged in a pressurised zone of the aircraft.

The system according to the invention for cooling an aircraft zone further includes an aircraft-side air-distribution system which includes at least one line connecting the mixing chamber to the aircraft zone to be cooled and also at least one line that is connectable to an aircraft-external air-generating assembly in order to convey air made available by the aircraft-external air-generating assembly into the aircraft-side air-distribution system. The cooling system according to the invention may be provided to be connected to an arbitrary aircraft-external air-generating assembly. For example, the system may be set up to be connected to a conventional low-pressure air-generating assembly which generates air with a temperature of about +5° C. However, the cooling system according to the invention is preferentially provided to be connected to an aircraft-external low-pressure air-generating assembly that is capable of generating cooling air with a very low temperature of below 0° C.

The system according to the invention for cooling an aircraft zone further includes a detection device for detecting a parameter indicating an operating state in the aircraft-side air-distribution system and/or in the mixing chamber. A control unit of the cooling system according to the invention is set up to receive and evaluate signals made available by the detection device and, when the cooling system according to the invention is connected to the aircraft-external air-generating assembly, to control the operation of the aircraft-external air-generating assembly in a manner depending on the signals made available by the detection device. In other words, the control unit of the cooling system according to the invention enables the control of the operation of the aircraft-external air-generating assembly directly in a manner depending on the operating state in the aircraft-side air-distribution system and/or in the mixing chamber.

By the monitoring of the operating state in the aircraft-side air-distribution system and/or in the mixing chamber and by the corresponding adaptation of the operation of the aircraft-external air-generating assembly, critical operating states in the aircraft-side air-distribution system and/or in the mixing chamber—such as, for example, icings in these regions of the cooling system—can either be entirely avoided or at least detected early and eliminated by appropriate control of the operation of the aircraft-external air-generating assembly. In conjunction with an aircraft-external air-generating assembly which makes air available with a temperature of below 0° C., the cooling system according to the invention can therefore be operated particularly safely. Furthermore, the cooling system according to the invention enables an adaptation of the cooling capacity made available by the aircraft-external air-generating assembly to the demand of the cooling system for cooling capacity. Operating states in which the aircraft-external air-generating assembly generates cooling capacity that is not needed can therefore be avoided, and the aircraft-external air-generating assembly can consequently be operated in more energy-efficient manner.

The control unit of the cooling system according to the invention is preferentially set up to control the operation of the aircraft-external air-generating assembly in dependence on the signals made available by the detection device in such a manner that the temperature and/or the mass flow of the air made available by the aircraft-external air-generating assembly is/are adjusted to the operating state in the aircraft-side air-distribution system and/or in the mixing chamber and/or the aircraft-external air-generating assembly is switched off. An adaptation of the temperature or of the mass flow of the air made available by the aircraft-external air-generating assembly presents itself, for example, if the control unit of the cooling system according to the invention detects, on the basis of the signals supplied to it by the detection device, that the operating state in the aircraft-side air-distribution system and/or in the mixing chamber deviates only to a certain extent from a specified operating state. A disconnection of the aircraft-external air-generating assembly may, on the other hand, be indicated when the operating state in the aircraft-side air-distribution system and/or in the mixing chamber deviates very greatly from a specified operating state or even approaches a critical operating state. A disconnection of the aircraft-external air-generating assembly may, however, also be sensible when, for example by reason of the ambient conditions or if in defined operating situations only a low demand for cooling capacity obtains in the aircraft zone to be cooled, a negligibly low demand or no demand for cooling capacity is made on the aircraft-external air-generating assembly by the cooling system according to the invention.

The detection device of the system according to the invention for cooling an aircraft zone may include at least one temperature sensor. Furthermore, the control unit of the cooling system according to the invention may be set up to control the operation of the aircraft-external air-generating assembly in such a manner that the temperature of the air made available by the aircraft-external air-generating assembly is increased or the aircraft-external air-generating assembly is switched off if the control unit detects, on the basis of the signals made available by the detection device, that the temperature of the air in the aircraft-side air-distribution system and/or in the mixing chamber lies below a lower critical threshold value. The lower critical threshold value may amount to, for example, +2° C. By such a control of the operation of the aircraft-external air-generating assembly, the risk of icing in the aircraft-side air-distribution system and/or in the mixing chamber can be distinctly reduced.

It will be understood that the control unit of the cooling system according to the invention may also be set up to control the operation of the aircraft-external air-generating assembly in such a manner that the temperature of the air made available by the aircraft-external air-generating assembly is reduced if the control unit detects, on the basis of the signals made available by the detection device, that the temperature of the air in the aircraft-side air-distribution system and/or in the mixing chamber lies above an upper critical temperature threshold value. By such a control of the operation of the aircraft-external air-generating assembly, it can be guaranteed that the cooling system is supplied at all times with sufficient cooling energy by the aircraft-external air-generating assembly.

Furthermore, the detection device of the cooling system according to the invention may include at least one pressure sensor. The control unit may be set up to control the operation of the aircraft-external air-generating assembly in such a manner that the mass flow of the air made available by the aircraft-external air-generating assembly is reduced and/or the temperature of the air made available by the aircraft-external air-generating assembly is increased or the aircraft-external air-generating assembly is switched off if the control unit detects, on the basis of the signals made available by the detection device, that the pressure in the aircraft-side air-distribution system and/or in the mixing chamber lies either below a lower critical threshold value or above an upper critical pressure threshold value. In order to compare the pressure measured by means of the pressure sensor with the lower or the upper pressure threshold value, the control unit can receive and process information about the mass flow of cooling air made available by the aircraft-external air-generating assembly. This information can be made available to the control unit by the aircraft-external air-generating assembly. A pressure lying below a lower critical threshold value may be appraised as an indication of an icing in a region of the aircraft-side air-distribution system or of the mixing chamber situated upstream of the pressure sensor relative to the direction of flow of the air through the aircraft-side air-distribution system or the mixing chamber. Similarly, a pressure lying above an upper critical pressure threshold value may be appraised as an indication of an icing in a region of the aircraft-side air-distribution system and/or of the mixing chamber situated downstream of the pressure sensor relative to the direction of flow of the air through the aircraft-side air-distribution system and/or the mixing chamber.

In the case of comparatively slight deviations of the pressure value measured by the pressure sensor from the lower critical pressure threshold value or from the upper critical pressure threshold value, for the purpose of eliminating icing and for the purpose of avoiding a critical operating state in the aircraft-side air-distribution system and/or in the mixing chamber it may be sufficient to reduce the mass flow of the air made available by the aircraft-external air-generating assembly and/or to increase the temperature of the air made available by the aircraft-external air-generating assembly. If, however, the pressure value measured by the pressure sensor lies far below the lower critical pressure threshold value or far above the upper critical pressure threshold value, for the purpose of avoiding a critical operating state in the aircraft-side air-distribution system and/or in the mixing chamber it may be necessary to switch off the aircraft-external air-generating assembly and hence to interrupt the supply of air from the aircraft-external air-generating assembly into the air-distribution system of the cooling system according to the invention. Furthermore, in the case of measured pressure values in the aircraft-side air-distribution system and/or in the mixing chamber lying between the lower critical pressure threshold value and the upper critical pressure threshold value the control unit may be set up to control the operation of the aircraft-external air-generating assembly, in particular the mass flow of the air made available by the aircraft-external air-generating assembly and/or the temperature of the air made available by the aircraft-external air-generating assembly, in such a manner that the pressure in the aircraft-side air-distribution system and/or in the mixing chamber corresponds to an optimised specified pressure value.

The measuring device or the sensors of the measuring device may be arranged at arbitrary positions in the aircraft-side air-distribution system. But, depending on the chosen position, where appropriate several pressure sensors and/or temperature sensors may then be required in order to guarantee an optimal monitoring of the operating state in the aircraft-side air-distribution system and/or in the mixing chamber. Since the temperature prevailing in the mixing chamber, just like the pressure prevailing in the mixing chamber, permits inferences as to the operating state in regions of the aircraft-side air-distribution system that, relative to the direction of flow of the air through the aircraft-side air-distribution system and the mixing chamber, are situated both upstream and downstream of the mixing chamber, for the purpose of minimising the number of requisite sensors of the measuring device it is advantageous to arrange the measuring device or the sensors of the measuring device in the mixing chamber. As a result, the costs and the complexity of the cooling system, just like the system weight, can be reduced.

The control unit of the system according to the invention for cooling an aircraft zone may furthermore be set up to receive and evaluate signals made available by the aircraft-external air-generating assembly that indicate the operating state of the aircraft-external air-generating assembly. The signals indicating the operating state of the aircraft-external air-generating assembly can then be taken into account by the control unit in connection with the control of the operation of the aircraft-external air-generating assembly. For example, the signals made available by the aircraft-external air-generating assembly can provide the control unit with information about the mass flow and/or the temperature of the air made available by the aircraft-external air-generating assembly.

The control unit of the cooling system according to the invention may be connected to a memory in which operating parameters of the system are saved. The memory may be integrated into the control unit or may be designed in the form of a separate memory or in the form of a memory assigned to another control unit. By way of operating parameters saved in the memory, in particular parameters such as, for example, a maximally permissible total mass flow of the air made available by the aircraft-external air-generating assembly, a maximal system pressure of the aircraft-external air-generating assembly, a minimal temperature of the air made available by the aircraft-external air-generating assembly in normal operation, a minimal temperature of the air made available by the aircraft-external air-generating assembly when aircraft-side instrument errors obtain, etc, enter into consideration. A control unit that can have recourse to such system operating parameters saved in a memory may then be set up to control the operation of the aircraft-external air-generating assembly in a manner depending on the system operating parameters saved in the memory, i.e. to take into account the system operating parameters saved in the memory in connection with the control of the aircraft-external air-generating assembly.

The control unit of the cooling system according to the invention is preferentially designed in the form of an electronic control unit. The control unit may form an aircraft-side component of the system, i.e. it may have been provided to be integrated within an aircraft. Alternatively, however, the control unit may also be designed in the form of a separate component or may even form a component of the aircraft-external air-generating assembly. The control unit may be connected via appropriate data lines to the detection device and also to the aircraft-external air-generating assembly. Alternatively, the control unit, the aircraft-external air-generating assembly and the detection device may also be constructed in such a way that a wireless communication of signals and data between these components is possible.

A process according to the invention for cooling an aircraft zone includes the provision of a system, described above, for cooling an aircraft zone. Subsequently the cooling system is connected to an aircraft-external air-generating assembly. The operation of the aircraft-external air-generating assembly is controlled by means of the control unit in dependence on the signals that the control unit receives from the detection device for detecting a parameter indicating the operating state in the aircraft-external air-generating assembly and/or in the mixing chamber and evaluates.

The control unit preferentially controls the operation of the aircraft-external air-generating assembly in such a manner that the temperature and/or the mass flow of the air made available by the aircraft-external air-generating assembly is/are adjusted to an operating state in the aircraft-side air-distribution system and/or in the mixing chamber and/or the aircraft-external air-generating assembly is switched off.

If the detection device includes at least one temperature sensor, the control unit can control the operation of the aircraft-external air-generating assembly in such a manner that the temperature of the air made available by the aircraft-external air-generating assembly is increased or the aircraft-external air-generating assembly is switched off if the control unit detects, on the basis of the signals made available by the detection device, that the temperature of the air in the aircraft-side air-distribution system and/or in the mixing chamber lies below a lower critical temperature threshold value.

If the detection device alternatively or additionally includes at least one pressure sensor, the control unit can control the operation of the aircraft-external air-generating assembly in such a manner that the mass flow of the air made available by the aircraft-external air-generating assembly is reduced and/or the temperature of the air made available by the aircraft-external air-generating assembly is increased or the aircraft-external air-generating assembly is switched off if the control unit detects, on the basis of the signals made available by the detection device, that the pressure in the aircraft-side air-distribution system and/or in the mixing chamber lies either below a lower critical pressure threshold value or above an upper critical pressure threshold value.

Furthermore, in the case of the process according to the invention for cooling an aircraft zone the control unit can receive and evaluate signals made available by the aircraft-external air-generating assembly that indicate the operating state of the aircraft-external air-generating assembly. The signals indicating the operating state of the aircraft-external air-generating assembly can then be taken into account by the control unit in connection with the control of the operation of the aircraft-external air-generating assembly.

The control unit may be connected to a memory in which operating parameters of the system are saved. The control unit can then control the operation of the aircraft-external air-generating assembly in a manner depending on the system operating parameters saved in the memory.

An arrangement according to the invention for cooling an aircraft zone includes a system, described above, for cooling an aircraft zone and also an aircraft-external air-generating assembly that is suitable for connection to the cooling system.

Preferred embodiments of the invention will now be elucidated in more detail on the basis of the appended schematic drawings, in which.

Figure 1:
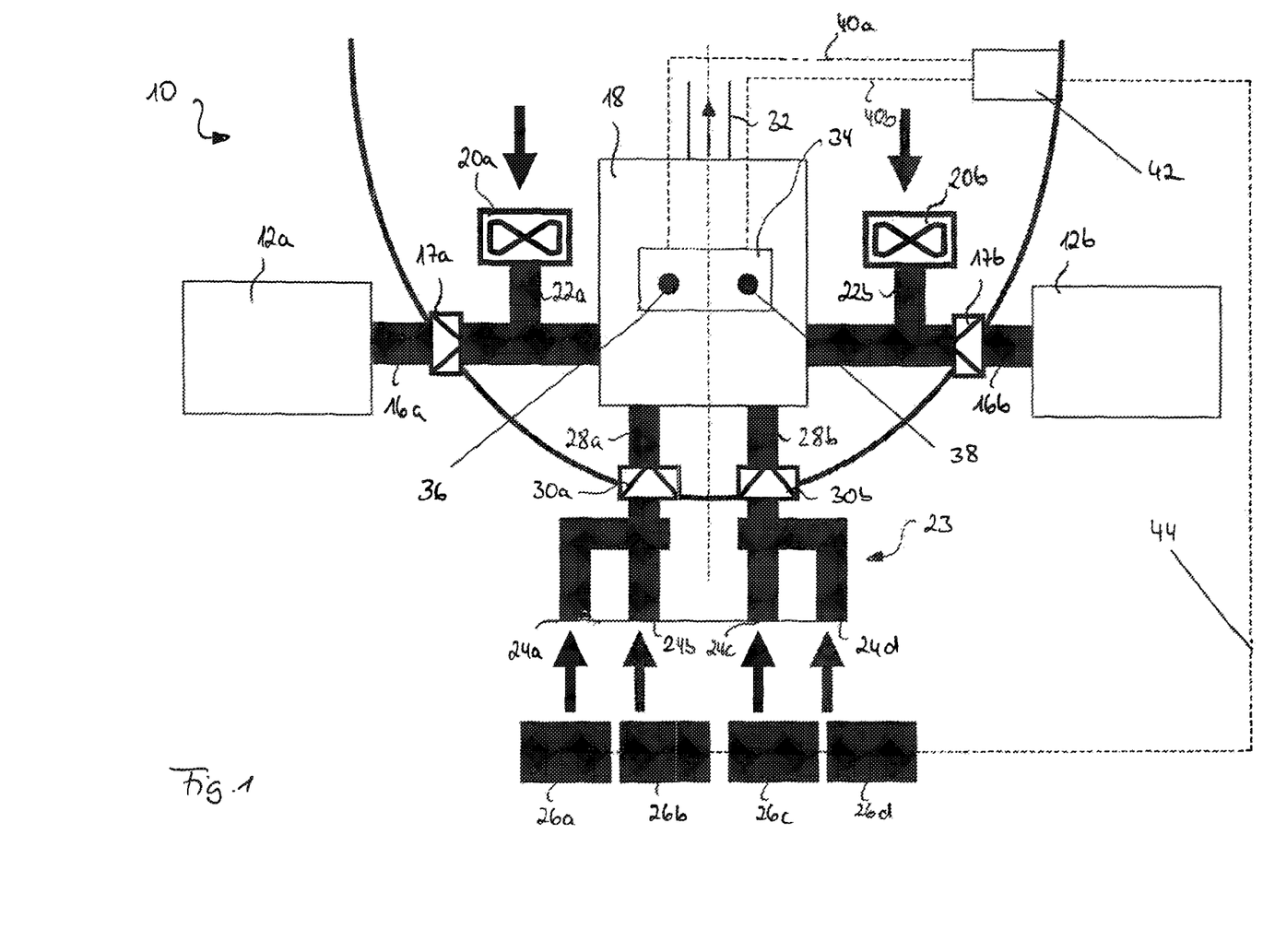
FIG. 1 shows a first embodiment of a system for cooling an aircraft zone.

A system 10 shown in FIG. 1 for cooling an aircraft zone includes two air-conditioning assemblies 12a, 12b which are respectively arranged in the wing-root regions of an aircraft in an unpressurised aircraft zone. The air-conditioning assemblies 12a, 12b make cool air available and are connected to a mixing chamber 18 via appropriate air-distribution lines 16a, 16b. Check valves 17a, 17b arranged in the air-distribution lines 16a, 16b prevent a back flow of air to be supplied to the mixing chamber 18 into the air-conditioning assemblies 12a, 12b. In the mixing chamber 18 the air made available by the air-conditioning assemblies 12a, 12b is mixed with recirculated air which with the aid of recirculated-air blowers 20a, 20b is aspirated out of an aircraft zone to be cooled. The air conveyed by the recirculated-air blowers 20a, 20b is conducted via connecting lines 22a, 22b firstly into the air-distribution lines 16a, 16b and from there into the mixing chamber 18.

The cooling system 10 further includes an aircraft-side air-distribution system 23. The aircraft-side air-distribution system 23 includes four aircraft-side ports 24a, 24b, 24c, 24d which are arranged in the region of a belly fairing of the aircraft and respectively connected to an aircraft-external low-pressure air-generating assembly 26a, 26b, 26c, 26d. Depending on demand, also fewer than four, or more than four, ports 24a, 24b, 24c, 24d may have been provided. A first inlet line 28a connects ports 24a, 24b to the mixing chamber 18. Similarly, a second inlet line 28b connects ports 24c, 24d to the mixing chamber 18. Check valves 30a, 30b arranged in the inlet lines 28a, 28b prevent a back flow of air to be supplied to the mixing chamber 18 in the direction of the ports 24a, 24b, 24c, 24d. Furthermore, the aircraft-side air-distribution system 23 includes a line 32 which connects the mixing chamber 18 to the aircraft zone to be cooled.

The cooling system 10 further includes a detection device 34 with a temperature sensor 36 arranged in the mixing chamber 18 and also with a pressure sensor 38 likewise arranged in the mixing chamber 18. The sensors 36, 38 of the detection device 34 serve to measure the temperature and the pressure in the mixing chamber 18. Signals made available by the detection device 34 are communicated to an electronic control unit 42 via data lines 40a, 40b. The electronic control unit 42 is set up to receive and evaluate the signals communicated from the detection device 34 and as a result to ascertain the operating state in the aircraft-side air-distribution system 23 and/or in the mixing chamber 18. Furthermore, the electronic control unit 42 is connected to the aircraft-external air-generating assemblies 26a, 26b, 26c, 26d via a data line 44. If desired or necessary, the data lines 40a, 40b, 44 connecting the electronic control unit 42 to the detection device 34 and also to the aircraft-external air-generating assemblies 26a, 26b, 26c, 26d may also be replaced by wireless communication paths.

The electronic control unit 42 controls the operation of the aircraft-external air-generating assemblies 26a, 26b, 26c, 26d in dependence on the signals made available by the detection device 34. In particular, the electronic control unit 42 is set up to control the operation of the aircraft-external air-generating assemblies 26a, 26b, 26c, 26d in dependence on the signals made available by the detection device 34 in such a manner that the temperature and/or the mass flow of the air made available by the aircraft-external air-generating assemblies 26a, 26b, 26c, 26d is/are adjusted to the operating state in the aircraft-side air-distribution system 23 and/or in the mixing chamber 18 and/or the aircraft-external air-generating assembly 26, 26b, 26c, 26d is switched off.

If the temperature sensor 36 of the detection device 34 in the mixing chamber 18 registers a temperature that lies below a lower critical temperature threshold value of, for example, +2° C., the electronic control unit 42 controls the operation of the aircraft-external air-generating assemblies 26a, 26b, 26c, 26d in such a manner that the temperature of the air made available by the aircraft-external air-generating assemblies 26a, 26b, 26c, 26d is increased. If the temperature of the air in the aircraft-side air-distribution system 23 and/or in the mixing chamber 18 measured by the temperature sensor 36 of the detection device 34 falls very far below the lower critical temperature threshold value, the control of the aircraft-external air-generating assemblies 26a, 26c, 26d by the electronic control unit 42 may also include the disconnection of the aircraft-external air-generating assemblies 26a, 26b, 26c, 26d. By such a control of the operation of the aircraft-external air-generating assemblies 26a, 26b, 26c, 26d, instances of icing in the aircraft-side air-distribution system 23 and/or in the mixing chamber 18 are avoided or quickly eliminated. This is particularly advantageous if in the case of the aircraft-external air-generating assemblies 26a, 26b, 26c, 26d it is a question of assemblies that are capable of generating air with a temperature below 0° C.

If with the aid of the pressure sensor 38 of the detection device 34 a pressure in the mixing chamber 18 is registered that lies below a lower critical pressure threshold value, the electronic control unit 42 appraises this as an indication of an icing in a region of the aircraft-side air-distribution system 23 situated upstream of the mixing chamber 18 relative to the direction of flow of the air through the aircraft-side air-distribution system 23 and the mixing chamber 18. In contrast, the electronic control unit 42 appraises a pressure registered by the pressure sensor 38 of the detection device 34 and lying above an upper critical pressure threshold value as an indication of an icing in a region of the air-distribution system 23 situated downstream of the mixing chamber 18 relative to the direction of flow of the air through the aircraft-side air-distribution system 23 and the mixing chamber 18, i.e. in the region of the line 32.

The electronic control unit 42 then controls the operation of the aircraft-external air-generating assemblies 26a, 26b, 26c, 26d in such a manner that the mass flow of the air made available by the aircraft-external air-generating assemblies 26a, 26b, 26c, 26d is reduced and/or the temperature of the air made available by the aircraft-external air-generating assemblies 26a, 26b, 26c, 26d is increased. If the pressure value measured by the pressure sensor 38 of the detection device 34 lies very greatly below the lower critical pressure threshold value or very greatly above the upper critical pressure threshold value, the control of the aircraft-external air-generating assemblies 26a, 26b, 26c, 26d by the electronic control unit 42 may also provide a disconnection of the aircraft-external air-generating assemblies 26a, 26b, 26c, 26d.

The electronic control unit 42 is furthermore set up to receive and evaluate signals from the aircraft-external air-generating assemblies 26a, 26b, 26c, 26d that indicate the operating state of the aircraft-external air-generating assemblies 26a, 26b, 26c, 26d. In particular, the electronic control unit 42 receives signals that indicate the mass flow and the temperature of the air made available by the aircraft-external air-generating assemblies 26a, 26b, 26c, 26d.

The electronic control unit 42 is furthermore provided with an integrated memory in which operating parameters of the system 10 are saved. The system operating parameters saved in the memory of the electronic control unit 42 include, for example, a maximally permissible total mass flow of the air made available by the aircraft-external air-generating assemblies 26a, 26b, 26c, 26d, a maximal system pressure of the aircraft-external air-generating assemblies 26a, 26b, 26c, 26d, a minimal temperature of the air made available by the aircraft-external air-generating assemblies 26a, 26b, 26c, 26d in normal operation and also a minimal temperature of the air made available by the aircraft-external air-generating assemblies 26a, 26b, 26c, 26d, taking account of aircraft-side instrument errors. The electronic control unit 42 controls the operation of the aircraft-external air-generating assemblies 26a, 26b, 26c, 26d, taking account of the system operating parameters saved in the memory of the control unit 42.

Figure 2:
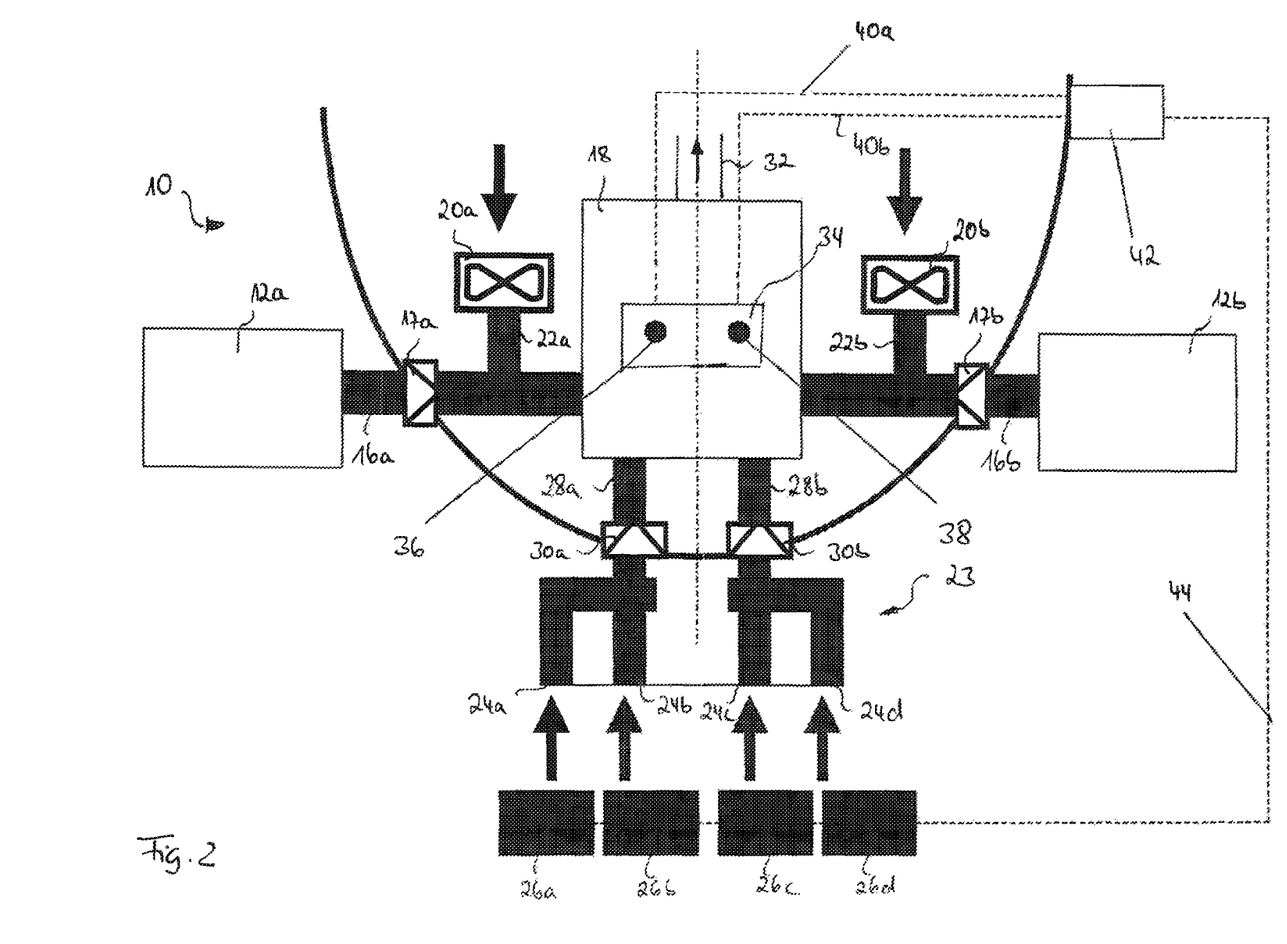
FIG. 2 shows a second embodiment of a system for cooling an aircraft zone and FIG. 3 shows a third embodiment of a system for cooling an aircraft zone.
Figure 3:
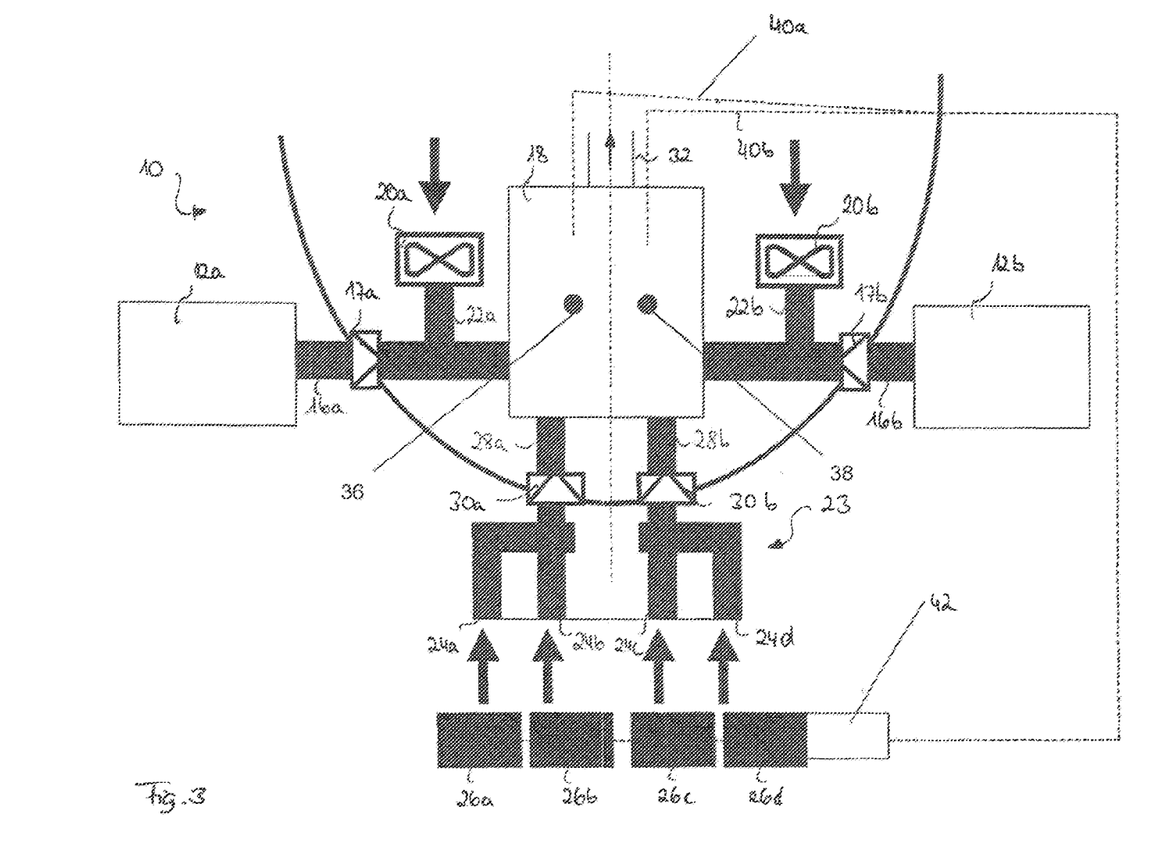

In the arrangement shown in FIG. 1, the electronic control unit 42 forms an aircraft-side component of the cooling system 10 and is arranged in the interior of the aircraft. In the case of the arrangement according to FIG. 2, on the other hand, the electronic control unit 42 is designed in the form of a separate component which in ground operation of the aircraft is connected to the aircraft-side components of the cooling system 10 and also to the aircraft-external air-generating assemblies 26a, 26b, 26c, 26d. Lastly, FIG. 3 shows an arrangement in which the electronic control unit 42 forms a component of the aircraft-external air-generating assembly 26d. In other respects, the structure and the mode of operation of the arrangements illustrated in FIGS. 2 and 3 correspond to the structure and the mode of operation of the system according to FIG. 1.

The invention claimed is:

1. System for cooling an aircraft zone, with:
    a mixing chamber which is connected to an air-conditioning assembly for making cool air available and to a recirculated-air conveying device for supplying recirculated air into the mixing chamber wherein in the mixing chamber the air made available by the air conditioning assembly and recirculated air are mixed, and
    an aircraft-side air-distribution system which includes at least one line connecting the mixing chamber to the aircraft zone to be cooled and also at least one line that is connectable to an aircraft-external air-generating assembly in order to route air made available by the aircraft-external air-generating assembly into the aircraft-side air-distribution system, characterized in that the system includes a detection device including at least one temperature sensor and at least one pressure sensor for detecting a temperature and pressure in the aircraft-side air-distribution system and/or in the mixing chamber and also a control unit which is set up to receive and evaluate signals made available by the detection device and, when the system is connected to the aircraft-external air-generating assembly, to control the operation of the aircraft-external air-generating assembly in a manner depending on the signals made available by the detection device.

2. System for cooling an aircraft zone according to claim 1, characterized in that the control unit is set up to control the operation of the aircraft-external air-generating assembly in dependence on the signals made available by the detection device in such a manner that the temperature and/or the mass flow of the air made available by the aircraft-external air-generating assembly is/are adjusted to the operating state in the aircraft-side air-distribution system and/or in the mixing chamber and/or the aircraft-external air-generating assembly is switched off.

3. System for cooling an aircraft zone according to claim 1, characterized in that the control unit is set up to control the operation of the aircraft-external air-generating assembly in such a manner that the temperature of the air made available by the aircraft-external air-generating assembly is increased or the aircraft-external air-generating assembly is switched off if the control unit detects, on the basis of the signals made available by the detection device, that the temperature of the air in the aircraft-side air-distribution system and/or in the mixing chamber lies below a lower critical temperature threshold value.

4. System for cooling an aircraft zone according to claim 1, characterized in that the control unit is set up to control the operation of the aircraft-external air-generating assembly in such a manner that the mass flow of the air made available by the aircraft-external air-generating assembly is reduced and/or the temperature of the air made available by the aircraft-external air-generating assembly is increased or the aircraft-external air-generating assembly is switched off if the control unit detects, on the basis of the signals made available by the detection device, that the pressure in the aircraft-side air-distribution system and/or in the mixing chamber lies either below a lower critical pressure threshold value or above an upper critical pressure threshold value.

5. System for cooling an aircraft zone according to claim 1, characterized in that the detection device is arranged in the mixing chamber.

6. System for cooling an aircraft zone according to claim 1, characterized in that the control unit is set up to receive and evaluate signals made available by the aircraft-external air-generating assembly that indicate the operating state of the aircraft-external air-generating assembly.

7. System for cooling an aircraft zone according to claim 1, characterized in that the control unit is connected to a memory in which operating parameters of the system are saved, and in that the control unit is set up to control the operation of the aircraft-external air-generating assembly in a manner depending on the operating parameters of the system saved in the memory.

8. System for cooling an aircraft zone according to claim 1, characterized in that the control unit forms an aircraft-side component of the system, is designed in the form of a separate component, or forms a component of the aircraft-external air-generating assembly.

9. Process for cooling an aircraft zone, with the following steps:
 providing a system for cooling an aircraft zone according to claim 1,
 connecting the system for cooling an aircraft zone to an aircraft-external air-generating assembly, and
 controlling the operation of the aircraft-external air-generating assembly by means of the control unit in dependence on the signals that the control unit receives from the detection device for detecting a parameter indicating an operating state in the aircraft-side air-distribution system and/or in the mixing chamber and evaluates.

10. Process for cooling an aircraft zone, according to claim 9, characterized in that the control unit controls the operation of the aircraft-external air-generating assembly in such a manner that the temperature and/or the mass flow of the air made available by the aircraft-external air-generating assembly is/are adjusted to the operating state in the aircraft-side air-distribution system and/or in the mixing chamber and/or the aircraft-external air-generating assembly is switched off.

11. Process for cooling an aircraft zone, according to claim 9, characterized in that the detection device includes at least one temperature sensor and the control unit controls the operation of the aircraft-external air-generating assembly in such a manner that the temperature of the air made available by the aircraft-external air-generating assembly is increased or the aircraft-external air-generating assembly is switched off if the control unit detects, on the basis of the signals made available by the detection device, that the temperature of the air in the aircraft-side air-distribution system and/or in the mixing chamber lies below a lower critical temperature threshold value.

12. Process for cooling an aircraft zone, according to claim 9, characterized in that the detection device includes at least one pressure sensor and the control unit controls the operation of the aircraft-external air-generating assembly in such a manner that the mass flow of the air made available by the aircraft-external air-generating assembly is reduced and/or the temperature of the air made available by the aircraft-external air-generating assembly is increased or the aircraft-external air-generating assembly is switched off if the control unit detects, on the basis of the signals made available by the detection device, that the pressure in the aircraft-side air-distribution system and/or in the mixing chamber lies either below a lower critical pressure threshold value or above an upper critical pressure threshold value.

13. Process for cooling an aircraft zone, according to claim 9, characterized in that the control unit receives and evaluates signals made available by the aircraft-external air-generating assembly that indicate the operating state of the aircraft-external air-generating assembly.

14. Process for cooling an aircraft zone, according to claim 9, characterized in that the control unit is connected to a memory in which operating parameters of the system are saved, and in that the control unit controls the operation of the aircraft-external air-generating assembly in a manner depending on the operating parameters of the system saved in the memory.

15. Arrangement for cooling an aircraft zone, with
 a system for cooling an aircraft zone, according to claim 1, and
 an aircraft-external air-generating assembly that is suitable for connection to the system.

* * * * *